April 28, 1964 K. F. WALLACE 3,131,257
SIGNAL PROCESSING MEANS
Filed Feb. 9, 1961 3 Sheets-Sheet 1

KURT F. WALLACE
INVENTOR.
BY Nathan N. Kallman
ATTORNEY

KURT F. WALLACE
INVENTOR.

BY Nathan N. Kallman

ATTORNEY

April 28, 1964 K. F. WALLACE 3,131,257

SIGNAL PROCESSING MEANS

Filed Feb. 9, 1961 3 Sheets-Sheet 3

KURT F. WALLACE
INVENTOR.

BY Nathan N. Kallman

ATTORNEY

United States Patent Office 3,131,257

Patented Apr. 28, 1964

3,131,257

SIGNAL PROCESSING MEANS

Kurt F. Wallace, Redwood City, Calif., assignor to Ampex Corporation, Redwood City, Calif., a corporation of California Filed Feb. 9, 1961, Ser. No. 88,094

7 Claims. (Cl. 178—7.2)

Figures 1, 2:
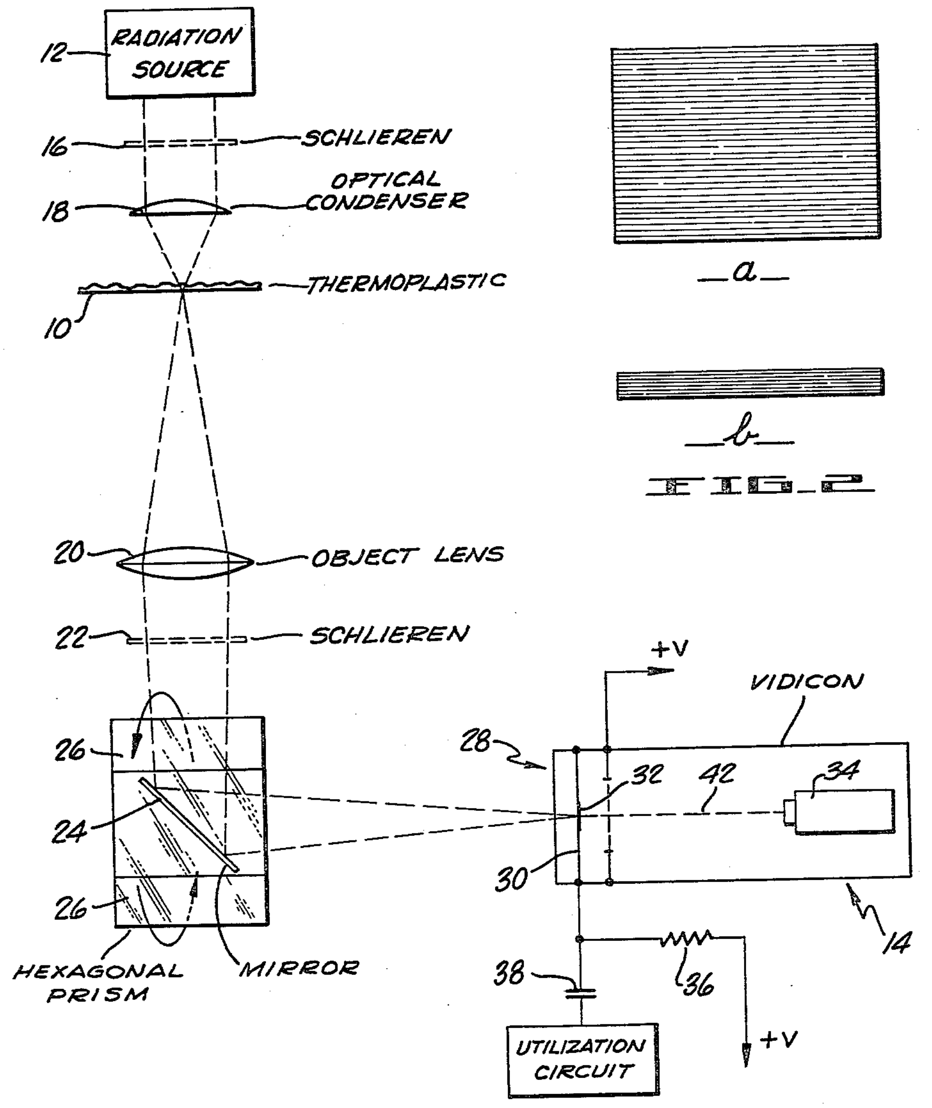
Figure 2:
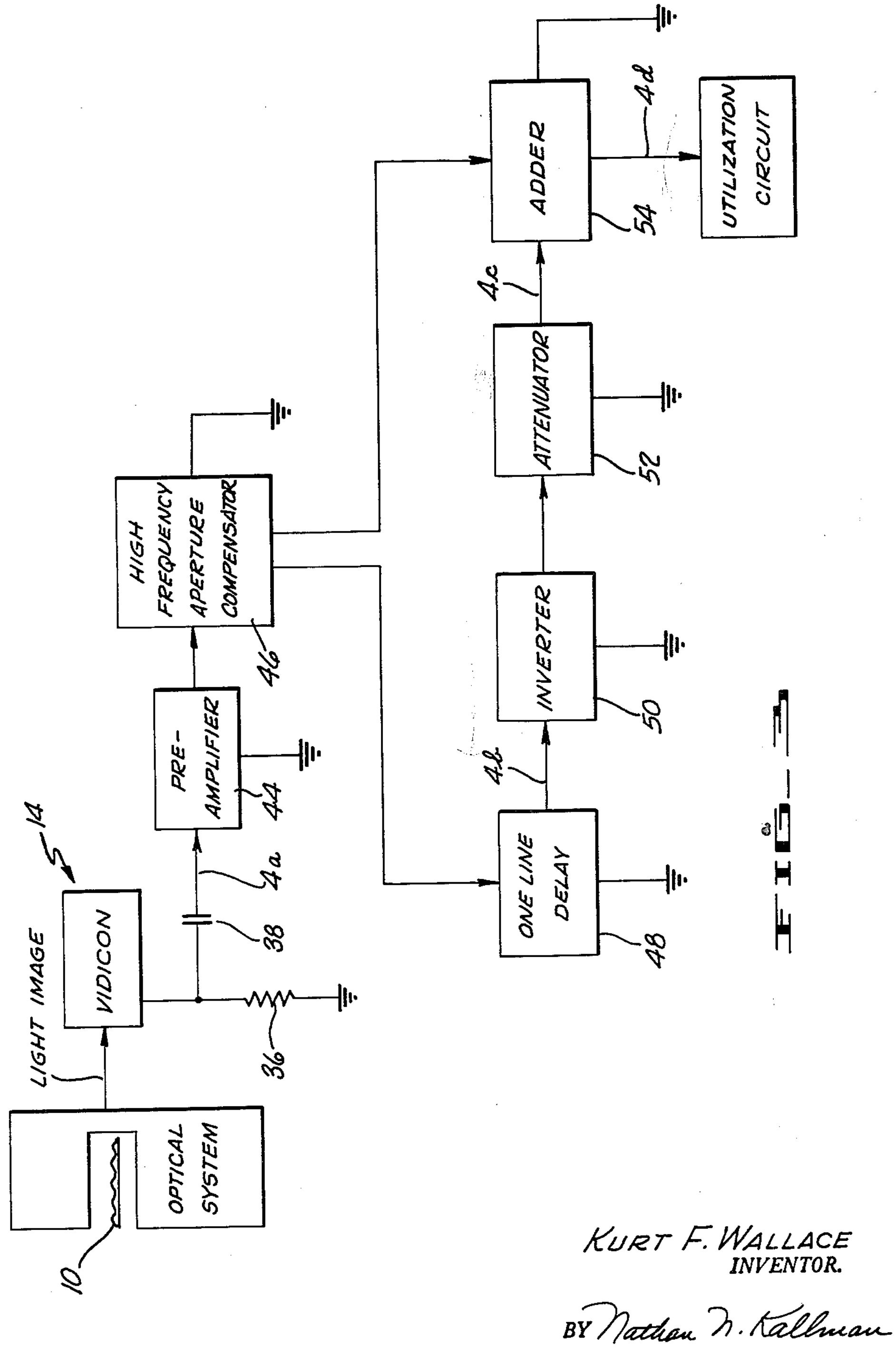

This invention relates to an electrical readout system, and in particular to an improved system for reproducing signal information recorded on a storage medium.

Various types of storage mediums are employed as memory devices for recording signal information that may be reproduced when desired. A major goal in the fabrication of storage devices is to provide very high packing densities so that a relatively large amount of information may be stored on as small an area as possible. Also, with higher packing densities it is possible to process higher frequency signals. Magnetic tapes, ferrite core assemblies, thin film memories and thermoplastic films are examples of storage devices that are preferably used. Thermoplastic storage mediums are especially desirable because information having frequency bandwidths in the 20 to 50 megacycle range, which includes signals in the radar range, may be recorded on a high density thermoplastic film.

Thermoplastic recording is a recording technique wherein an electron beam records on image on a special film that may be viewed optically. A description of the technique may be found in the SMPTE Journal, September 1960, on page 577. As described, the special film may consist of a base having a relatively high melting point coated with a transparent conductor that has on its surface a thin layer of a thermoplastic having a relatively low melting point. A modulated electron beam is used to deposit a charge pattern on the surface of the thermoplastic layer in accordance with the signal information to be stored, and the film is then heated to the melting point of the thermoplastic. Electrostatic forces between the charges on the thermoplastic layer and a reference potential applied to a conducting surface on the other side of the layer depress the surface where the charges appear until these forces are in equilibrium with the surface tension restoring forces. The film is then cooled below its melting point and the deformations become "frozen" in the surface.

In order to utilize the recorded information that appears as physical deformations, which may be viewed optically, image camera tubes, such as the vidicon, employing a photoconductive target may be used for scanning the thermoplastic film to convert the information into electrical signals. However, although signal information of very high frequency may be recorded on a storage medium such as thermoplastic, difficulties are encountered when it is necessary to transduce recorded information of very high frequency that is basically in a physical or optical form to an electrical signal with conventional readout means as known today. These difficulties, which do not allow faithful reproduction of very high frequency signals, arise from limitations inherent in the readout system, such as the output capacitance of the image camera tube and the lag characteristic of the photoconductive target, inter alia. Thus, presently known optical readout systems used with thermoplastic recording limit the resolution and bandwidth which may be obtained.

An object of this invention is to provide an improved system for reproducing a recorded image.

Another object of this invention is to provide a system that is capable of processing very high frequency signals.

Another object is to provide an improved image camera tube for use with a readout system.

A further object is to provide an electronic network to compensate for photoconductive lag in an image camera tube.

According to this invention, a system for reproducing signal information recorded in an optical form includes an image camera tube for scanning the optical recording. The tube has a photoconductive target of a physical size less than the conventional target such that a lower electrical capacitance is provided in the output circuit. Thus, the upper cutoff frequency of the tube is increased and signals of much higher frequency may be processed without any appreciable attenuation. In addition compensation for the lag effect is provided by subtracting a percentage of the output voltage after delaying the output signal by one scan line.

The invention will be described in greater detail with reference to the drawing in which:

FIGURE 1 is a schematic diagram showing a readout system, in accordance with the invention;

FIGURES 2*a* and 2*b* represent the photoconductor targets employed in the image camera tubes of the prior art and in the system of this invention respectively;

FIGURE 3 is a block diagram illustrating the electronic network associated with the system of this invention; and FIGURES 4*a–d* show a series of waveforms that are developed during the processing of the transduced signal in the system of FIGURE 3.

In FIGURE 1 a system is shown for reading out signal information registered on a substantially transparent thermoplastic film 10. A source of light radiation 12, such as an incandescent lamp, provides light rays for deflection by the rippled surface of the thermoplastic film 10 and for subsequent transformation of the light radiation to electrical signals. The light radiation is directed through the thermoplastic film 10 for application to an image camera tube 14 by means of an optical system that includes schlieren apparatus.

In operation, a light beam from the lamp 12 is passed through a schlieren mask 16 that intercepts a portion of the light rays. The radiation is then directed through an optical condenser 18 that collimates the light rays prior to impingement on the thermoplastic film 10. Since the film 10 is substantially transparent, the light beam passes through the film with an angular displacement or deflection proportional to the slope and depth of the depression at the instantaneously scanned area.

A thermoplastic recording may be considered as a multiplicity of very small prisms with varying angles. The brightness of radiation from any area on a thermoplastic recording that is processed in a schlieren system depends on the amount of light deflected from the prismatic elements at this area. Therefore it is noted that the intensity of the light radiation that passes the aperture 22 is a function of the recorded image. The deflection is a function of the slope of a recorded ripple on the thermoplastic, as well as the length of such a slope. Those areas that are essentially parallel to the surface of the thermoplastic film, that is, where no signal information is impressed, do not deflect any light.

The modulated light beam that is derived from the thermoplastic film 10 then passes through an object lens 20 and is focused on a second schlieren mask 22 that is aligned in a complementary arrangement with the first schlieren mask 16. The combination of the schlieren apertured masks 16 and 22 limits the passage of radiation from the source 12 to the camera tube 14, except for those light rays that are deflected by the ridges in the thermoplastic film 10. In other words, the schlieren system blocks all light in the absence of interference effects. Therefore, only the deflected radiation containing signal information represented by the deformed areas of the thermoplastic film 10 is transmitted through the second schlieren mask 22 to a reflecting mirror 24 that is disposed angularly between the schlieren optical system and the camera tube 14.

The light radiation representing the recorded signal information is reflected to the camera tube 14 by the mirror 24. If the information is recorded transversely and the thermoplastic film 10 is moved longitudinally at a constant speed for readout, as in television signal recording and reproducing, then the camera tube 14 may scan the reflected image line by line. In order for the scanned line to appear stationary relative to the camera tube 14, a rotating hexagonal prism 26 is employed to "fix" the image which is moving together with the thermoplastic film 10 to avoid image smearing.

In the embodiment of the invention described herein, the camera tube 14 may be the well-known vidicon tube. The vidicon tube is an electron tube that has at one end a photoconductive target 28 comprising a transparent conductive coating 30, acting as a signal plate, and a layer of photoconductive material 32 applied to the signal plate. At the other end of the tube is an electron gun 34 which generates an electron scanning beam of low velocity below the first crossover potential of the secondary emission curve, in a well-known manner. The beam of slow electrons stabilizes the surface of the target 28 at the potential of the cathode of the electron gun. Thus, by applying a positive voltage to the signal plate 30, a potential difference is set up across the target 28. Where light falls on the target 28, a more conductive path is established, a current flows across the target, and the potential of the illuminated target elements rises towards the signal plate potential. When the beam scans over the target surface, it restores the elements in turn to cathode potential, and thereby a train of electrical current pulses is generated in a signal resistor 36, which constitutes the output signal. The output signal may then be applied through an output capacitor 38 to a utilization circuit 40 for further processing.

As previously noted, the conventional vidicon tube has a photoconductive target with an aspect ratio of about 4:3, as shown in FIGURE 2*a*. It is known that with a fixed capacity relative to ground, the signal output is decreased as the frequency of the processed signal is increased. It is also known that the inherent capacitance of the vidicon tube is such that only signals of frequencies extending up to about 20 megacycles may be effectively processed with a desirable signal-to-noise ratio. In accordance with this invention, the overall physical size of the photoconductor 32 is reduced by decreasing the vertical dimension so that the aspect ratio is about 10:1, as illustrated in FIGURE 2*b*. Thus, it is seen that the capacitance to ground of the modified vidicon tube 14 of this invention is approximately $\frac{4}{30}$ of the capacitance of a conventional vidicon, and therefore the tube's cutoff frequency is increased by about 7.5, thereby extending the available operating facility of the tube from 20 megacycles to approximately 150 megacycles.

The reduced size of the photoconductor 32 is especially adaptable to a single line scan mode of operation, wherein the scanning electron beam 42 from the gun 34 repeatedly scans substantially in the same horizontal plane without any appreciable vertical deflection. The vertical dimension of the photoconductor 32 is sufficiently large so that an electrical servotracking apparatus (not shown) may be utilized to compensate for spurious variations in the motion of the thermoplastic film 10, for misalignment of the scanning beam 42, or for other system errors.

Successive scanning of the same line or area of the photoconductor 32 experiences photoconductive lag because the time constant of the target is materially greater than the time between successive scannings. The lag characteristic results from the relatively slow decay of presently known photoconductors and leaves an undesirable residual pattern on the target after readout has been accomplished. Therefore, the image in the form of stored migrating charges is not completely erased or discharged by the scanning electron beam 42.

Figure 4:
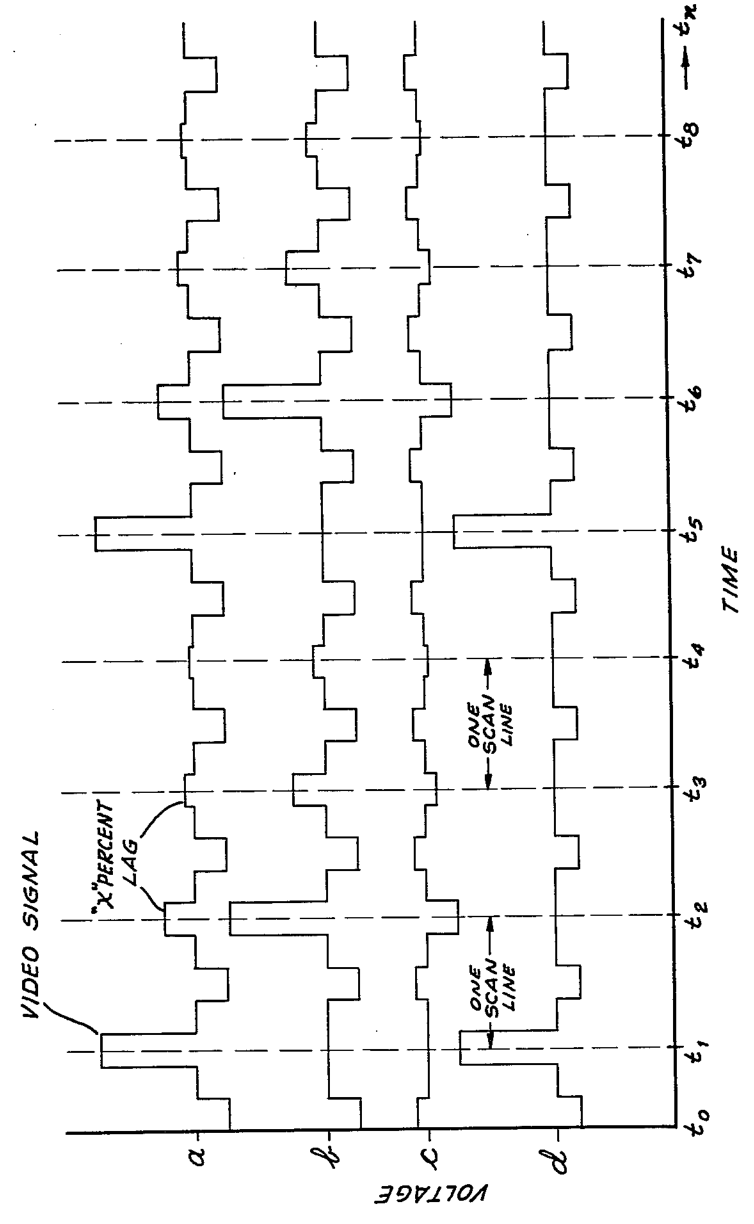

A compensating system, such as shown in FIGURE 3, corrects for such lag by processing the output signal derived from the output capacitor 38, such output signal being shown in FIGURE 4*a* as a pulse at $t_1$, by way of example. It is to be noted that those signals appearing at times $t_2$ and $t_3$ in FIGURE 4*a* represent a percentage of the actual video signal at $t_1$, which percentage signal arises as a result of the lag factor or failure to completely discharge the stored video signal during the erasing process. The compensating system receives the output signal from the capacitor 38 through a preamplifier 44, and directs the amplified signal to a high frequency aperture compensator 46. As is well known, the compensator 46 corrects for impedance characteristics and aperture defect so that signal attenuation is substantially constant for the low and high frequency signals. A compensator, such as shown in Fink's "Television Engineering Handbook" published by McGraw-Hill, 1957, on page 16–118 (FIGURE 16–129) may be employed for this purpose. The corrected output signal is then supplied to a delay device 48 wherein the signal is delayed for one scan line, as shown in FIGURE 4*b*. The delayed signal is inverted by an inverter 50, and an attenuator 52 steps down the amplitude of the inverted signal to provide a waveform such as shown in FIGURE 4*c*. The attenuation of the inverted signal is in proportion to the percentage of the video signal that appears as the undesirable lag signal, which may be about 33⅓% as illustrated. This attenuated inverted signal that is delayed for one scanning line (from $t_1$ to $t_2$) is then added to the output signal derived from the compensator 46 in an adder 54. The resultant output signal, illustrated in FIGURE 4*d*, thereby represents only the desirable video signal while the spurious lag pulses are effectively negated.

Although the embodiment of the invention presented as an example herein includes only one vidicon tube for scanning an optical image, two or more vidicons may be employed in an alternating or sequential scanning manner so that there is no loss of signal information during retrace. Also, the vidicon tube need not be restricted to scanning only a single line on the photoconductor target area, but may scan a plurality of recorded lines by using well-known vertical deflection means. This would allow slower rotation of the hexagonal prism 26 for making the moving image relatively stationary to the vidicon camera, and also provide reduction in the lag characteristic.

Also, it may be desirable to provide a photoconductor having a substantially greater horizontal dimension than found in conventional vidicons together with a substantially smaller vertical dimension. Such structure affords slower scanning repetition rates, and thus may reduce the need for a multiplicity of vidicons necessary to maintain continuous information.

It is to be understood that the invention is not limited to the vidicon tube, but encompasses the use of other camera tubes utilizing a photoconductive target. Furthermore, the invention is not necessarily limited to the configurations and proportions illustrated and defined in this application but is generally applicable to any readout system including means for converting an optical image to an electrical signal, and wherein the electrical parameters of the system are adapted to process very high frequency signals, and means are provided for compensating for the effect of photoconductive lag.

What is claimed is:

1. A system for reproducing signal information recorded in the form of a physical image on a transparent thermoplastic film comprising: means for applying light radiation to said film; optical means for limiting the radiation that is received at the output of said film so that only such radiation which is modulated by said recorded image is effectively transmitted from said thermoplastic film; an imgae camera tube having a photoconductive target for scanning said transmited modulated radiation, said photoconductive target having a low electrical capacitance so that very high frequency signal information may be processed; and a utilization circuit coupled to the output of said image camera tube including an electronic network to compensate for the photoconductive lag of the target.

2. A system for reproducing information registered on a thermoplastic film in the form of physical deformations, such information representing high frequency signal information comprising: a source of light rays for impingement upon said thermoplastic film and for deflection in accordance with the slopes and depths of such deformations; optical interference apparatus for filtering all light rays from said source except light rays deflected by said thermoplastic film; a vidicon tube for viewing said deflected light rays and for converting the optical information to electrical signals, said vidicon having a target photoconductor with a low electrical capacitance so that high frequency signal information may be processed; and a utilization circuit for processing such electrical signals of high frequency including means for compensating for decay lag of said photoconductor.

3. A system for reproducing signal information recorded in the form of an image on a transparent thermoplastic film comprising: a source of radiation to be applied orthogonally relative to the face of said film; schlieren interference apparatus for eliminating such light radiation that passes through said film which does not represent recorded signal information; optical means for directing such radiation containing signal information toward a sensing means; a vidicon tube for sensing such information radiation, said tube having a target photoconductor with a horizontal dimension substantially greater than said vertical dimension providing a very low capacitance; and a utilization circuit coupled to the output of said vidicon tube, said utilization circuit comprising means for delaying the output signal; means for inverting and attenuating such delayed signal; and means for adding the delayed, inverted and attenuated signal to said output signal whereby spurious lag signals are effectively minimized thereby affording faithful reproduction of the recorded signal information.

4. An image camera tube comprising: a photoconductive target at one end of the tube, said target including a conductive signal backplate and a photoconductive layer adjacent to said backplate, said layer having a horizontal dimension substantially greater than its vertical dimension, such vertical dimension being substantially smaller than the vertical dimension of said signal backplate to provide a very low capacitance for the layer; an electron gun at the other end of said tube for scanning the photoconductive layer; and a utilization circuit coupled to said backplate for readout.

5. A vidicon camera tube for scanning an optical image having a photoconductive target comprising: an electron gun for scanning substantially in a single horizontal plane; a photoconductive target having an aspect ratio of 10–1 whereby the electrical capacitance of said target is effectively decreased; and an output circuit coupled to said vidicon tube for processing the electrical signal derived from said target representing said optical image, said output circuit including electronic means for minimizing the lag inherent in said photoconductive target.

6. An electronic system for compensating for photoconductive lag in a vidicon tube comprising: means for amplifying the output signal from said vidicon tube; a high frequency aperture compensator coupled to said amplifying means for correcting for irregularities of said tube; a one line delay device coupled to the output of said compensator for delaying the signal being processed for a period corresponding to the scanning of one line of information; an inverter for inverting said delay signal coupled to said delay means; an attenuator for decreasing the amplitude of said inverted signal; and an adder for adding said attenuated signal to said output signal to minimize spurious lag signals.

7. A system for reproducing signal information recorded on a transparent thermoplastic film comprising: a source of radiation to be applied to the face of said film; means for eliminating such light radiation that passes through said film which does not represent signal information; optical means for directing such radiation containing signal information towards a tensing means; a vidicon tube for sensing such information radiation, said tube having a target photoconductor with a horizontal dimension substantially greater than the vertical dimension to provide a very low capacitance; and a utilization circuit coupled to the output of said vidicon tube, said utilization circuit comprising means for delaying the output signal; means for inverting and attenuating such delay signal; and means for combining the delayed, inverted and attenuated signal with said output signal whereby spurious lag signals are effectively minimized thereby affording faithful reproduction of the recorded signal information.

References Cited in the file of this patent

UNITED STATES PATENTS

| | | |
|---|---|---|
| 2,379,906 | Hogan | July 10, 1945 |
| 2,864,887 | Weimer | Dec. 16, 1958 |
| 2,957,042 | Gibson | Oct. 18, 1960 |
| 3,026,416 | Weimer | Mar. 20, 1962 |
| 3,044,358 | Glenn | July 17, 1962 |

OTHER REFERENCES

Publication: "TPR Recording," Electronic Industries, February 1960, pp. 76 to 79.